United States Patent

[11] 3,582,922

[72] Inventor  Leonard J. Greshel
              Concord, Mass.
[21] Appl. No. 740,794
[22] Filed     May 20, 1968
              Continuation of Ser. No. 455,914, May 14, 1965, abandoned, and Continuation of Ser. No. 689,213, Nov. 6, 1967, abandoned.
[45] Patented  June 1, 1971
[73] Assignee  ITM Integer Inc.

[54] REMOTE METER-READING APPARATUS
     6 Claims, 4 Drawing Figs.
[52] U.S. Cl. .................................................. 340/204,
                        179/100.2, 340/150, 340/195, 340/351
[51] Int. Cl. ........................................... G08c 19/16,
                                                        G08c 9/04
[50] Field of Search .......................................... 179/100.2
                                                      (B), 340/204

[56] References Cited
     UNITED STATES PATENTS
     2,832,840  4/1958  Morin ........................ 179/100.2B
     2,899,751  8/1959  Mayes ........................ 340/204
     3,031,534  4/1962  Trumble ..................... 179/100.2B Primary Examiner—Thomas B. Habecker
Attorney—John Noel Williams ABSTRACT: A telemetering device is provided for reading meters from remote locations. A tape having recorded digital data thereon is drivingly connected to the meter to be advanced past a reference point by operation of the meter. A tape reading head is disposed along the path of the tape at the reference point and, on signal, reciprocates a short distance along the tape to make a nonambiguous reading of the tape position. A coding system is provided for identifying each of a number of different units.

PATENTED JUN 1 1971  3,582,922

INVENTOR.
LEONARD J. GRESHEL
BY
Morse, Altman & Oates
ATTORNEYS

REMOTE METER-READING APPARATUS

This application is a continuation of my copending applications Ser. No. 455,914, filed May 14, 1965 and subsequently abandoned, and Ser. No. 689, 213, filed Nov. 6, 1967, now abandoned. The invention relates to apparatus by which information can be obtained from an information-carrying member, such as a tape, band, disc or drum, movable to carry a series of bits of information past a point of reference, the apparatus being at a distance from the member. More particularly, the invention relates to a device by which a reading can be given at any time at a distance from an information-carrying member which is mechanically driven to carry bits of information serially past a certain point in step with the rotation of a shaft or metering movement of some other part in a meter so that reading taken from the member at the point of reference will indicate the amount of value of the subject which has been measured up to the time of the reading. For example, the device can be used for taking readings from a meter which measures the quantity of a fluid such as water, gas, oil or electricity passing through the meter. In the embodiment of the invention hereinafter described in detail, a conditioned tape, preferably magnetic and preferably endless, is driven past a point of reference in step with a movable measuring element of a meter, such as a rotatable shaft, so that a reading taken at any time at the point of reference will indicate the quantity of fluid which has passed through the meter up to that time. The device is adapted to be installed on an existing meter with little or no alteration in the meter itself. The device is interrogated by electric pulses transmitted thereto by wires from remote positions, the resultant operation of the device causing electric signals indicating the reading of the meter at the time of the interrogation to be sent over wires to any desired location. For example, a device embodying the invention mounted on a gas, water or electric meter within a dwelling can be wired to an outlet outside of the dwelling or can be connected by telephone wires or otherwise to a distant central station. If connected to an outlet outside the dwelling, a meter reader can at any time plug in a portable set containing batteries for supplying voltage and a recording device to record on a magnetic tape signals received from the telemetering device in response to activation thereof by a voltage pulse from the portable set.

The telemetering device is adapted for use in conjunction with means for feeding identifying data to the recording tape in the portable set so that the location of each meter from which a reading is taken will be recorded with the reading itself.

According to the invention, the telemetering device contains an information-carrying member such as a tape, disc or drum which is movable in step with a variable quantity to be measured. A convenient example of such a member is a tape, preferably an endless magnetic tape, which is driven by or in step with the rotation of a shaft or metering movement of some other part in a meter actuated by passage through the meter of the substance to be measured. The tape is conditioned to produce digital signals through a transducer head when activated. The tape usually advances very slowly past the head and keeps in step with the part of the meter actuated by the flow. The head is arranged to be moved quickly a limited distance along the tape to transmit signals from that portion of the tape which is under it during a rapid relative movement. Such movement may conveniently be caused by a solenoid with an armature, either the solenoid or the armature being mechanically connected to the transducer head, the other being stationary. A spring attached to the movable element or its connecting linkage may be conveniently employed to return the movable element to its usual position of rest after it has been given a quick scanning movement over the adjacent portion of the tape by energization of the solenoid.

For a more complete understanding of the invention, reference may be had to the following description of an embodiment thereof and to the drawing, of which:

Figure 1:
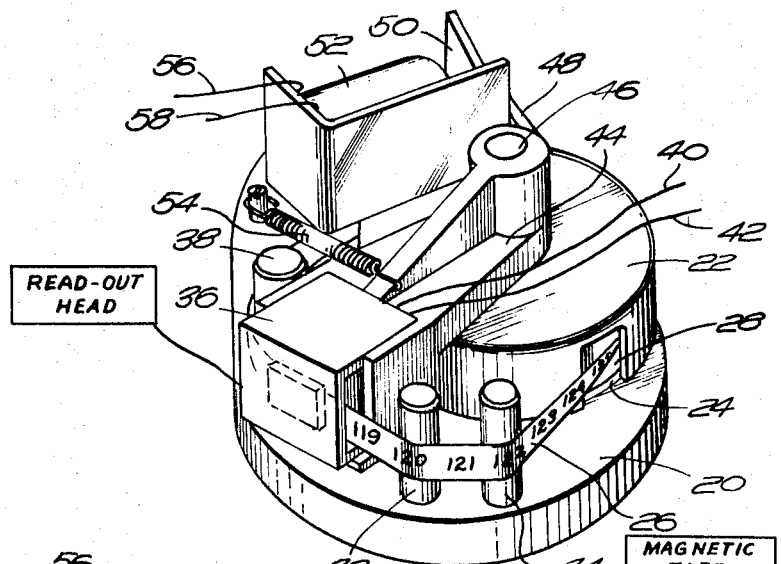
FIG. 1 is a perspective view of a telemetering device embodying the invention.
Figure 2:
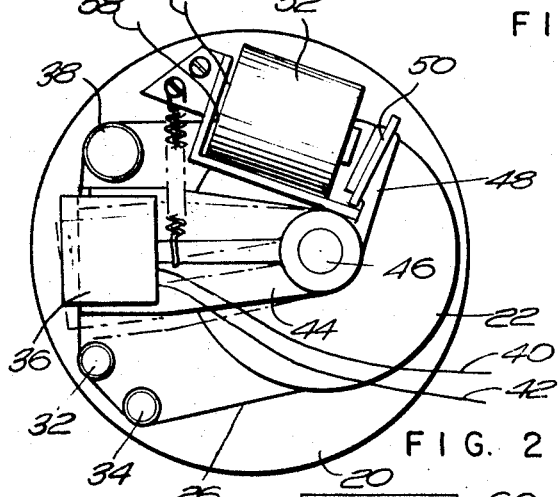
FIG. 2 is a plan view of the same.
Figure 3:
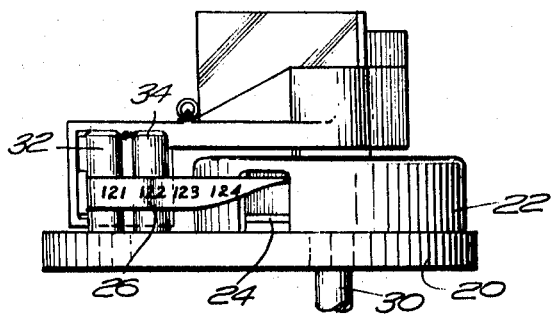
FIG. 3 is an elevational view of the same.

The telemetering device illustrated in FIGS. 1, 2 and 3 comprises a base 20 on which is mounted a housing 22 containing a tape reel 24 on which a coil of endless tape 26 is supported. From the inner turn of the coil the tape is drawn through a port 28 in the housing by rotation of the reel 24 which is mechanically connected to a shaft 30 (FIG. 3). The shaft is driven by meter mechanism (not shown), its rotation being a measure of the quantity of fluid passing through the meter. The tape is led past guide posts 32, 34, a conventional transducer head 36, and another guide post 38, and thence into the housing 22 where it rejoins the tape coil therein as its outermost turn. If a capstan drive is preferred for the tape 26, it can be located at any convenient point on the base 20 and operatively connected to the shaft 30. The transducer head may be of the usual construction having a split ring core with a coil thereon from the ends of which lead wires 40, 42 extend from the head to connect it electrically with a recording unit.

The head is carried by an arm 44 of a bellcrank which is pivoted at 46 to rock about a vertical axis. The bellcrank may conveniently be made of a suitable molded synthetic resin. The other arm 48 of the bellcrank carries an armature 50 of ferromagnetic material such as soft iron which is in a position to be attracted by a solenoid 52 when the latter is energized. The solenoid is mounted on the base 20. When it is energized, it attracts the armature 50 and rocks the bellcrank in a counterclockwise direction. This results in a quick movement of the head 36 along the adjacent portion of the tape 26 for a limited distance sufficient to include two consecutive quantity-indicating numbers so that one whole number will be received by the recording unit and an unequivocal reading of the quantity indicated by the tape will be thereby obtained. The solenoid 52 is promptly deenergized and is returned to its normal position by a tension spring 54 which is attached to the arm 44. Wires 56 and 58 lead from the solenoid.

The recordings on the tape 26 are made to indicate the corresponding readings on the usual dials of the meter with which the recordings on the tape keep in step as the tape is advanced slowly by the rotation of the shaft 30. If the telemetering device is to be used in conjunction with computer apparatus, the recordings on the tape 26 should be in terms of some digital code by which readings transmitted from the tape 26 to the tape of a recording unit can be relayed to a computer for further disposition. For visual checking, ordinary numerals may be printed on the back of the tape 26. Since a protective cover (not shown) is provided for the telemetering device, it will have a window opposite the guide posts 32, 34 through which the printed numerals on the tape can be read.

Figure 4:
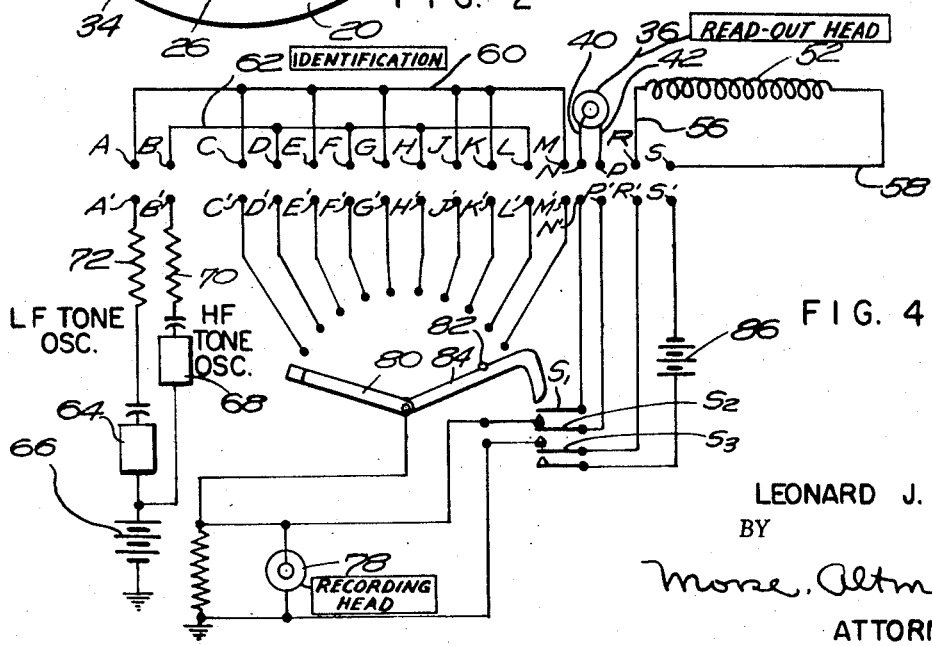
FIG. 4 is a wiring diagram of means for supplying identifying data to the recorder that receives signals from the telemetering device.

When a meter reading is taken on a recording unit, it is necessary to identify the meter from which the reading is taken. For this purpose apparatus such as is indicated by the wiring diagram shown in FIG. 4 may be employed, this being illustrative of various devices which can be employed for the purpose. In this example four wires are run from the telemetering device and twelve more from an identification device to the same number of terminals which can be a cluster of sockets at an outlet outside of the building in which the meter is located. In FIG. 4, these terminals are designated A, B, C, D, E, F, G, H, J, K, L, M, N, P, R, S, respectively. Corresponding to these terminals are mating terminals A', B', C', D', E', F', G', H', J', K', L', M', N', P', R', S', which are part of a portable unit carried by the meter reader and are to be plugged into the outlet. Of these, the terminals A to M and A' to M' inclusive are for use in transmitting signals to the portable unit to identify the meter at that location. For this purpose a wire 60 is connected at one end to the terminal A, and a wire 62 is connected similarly to the terminal B. The terminals C to M are connected selectively to one or the other of the wires 60 and 62 according to the code identifying that meter. For example, the wire 60 may carry a low frequency oscillation, when the portable unit is plugged in, from an oscillator 64 energized by a suitable source such as a battery 66 in the portable unit, while the wire 62 carries a high frequency oscillation from an oscillator 68 energized by the same source. If the low frequency stands for 0 in binary notation, and the high frequency stands for 1, the connections of the wire 60 to the terminals C, E, G, J, K and M, and the wire 62 to the terminals D, F, H and L, represent, by way of example, the binary number 0101010010 which is equivalent to 338 in the decimal system of numbering.

The transducer head 36 is connected by the wires 40 and 42 to the terminals N and P, respectively. The solenoid 52 is connected by the wires 56 and 58 to the terminals R and S, respectively.

In the portable unit indicated in FIG. 4, is a transducer head 78 for a recorder with a magnetic tape (not shown). This head receives and records first the identifying data and then the meter reading from the tape 26. To transmit the identifying data to the head 78, a sweep arm 80 is mounted in the unit and is movable about its pivot to connect the head 78 successively with leads from the terminals C' to M', these terminals having been connected respectively to the outlet terminals C to M. After the binary signals have been transmitted to the head 78, the sweep arm 80 is swung further about its pivot to engage a pin 82 on a second arm 84 of insulating material. This arm swings about the same pivot and closes successively a series of switches $S_1$, $S_2$ and $S_3$, the switches being closed in that order. The closing of switches $S_1$ and $S_2$ connects the head 26 with the head 78 through the terminals NN' and PP'. The subsequent closing of the switch $S_3$ closes a circuit through the solenoid 52 and a suitable battery 86 to energize the solenoid so that the head 36 will transmit the reading on the tape 26 to the head 78 in the portable unit. This operation can be repeated for successive meters, the identity and reading of each meter being recorded on the tape in the portable unit for use later in making out bills by computers or by other means.

It will be understood that the invention in its broader aspect does not require the use of a solenoid. The best mode presently contemplated without a solenoid would have a magnetic reading head mounted on an elongated pivot arm similar to that shown in the drawings. The arm however would have an arcuate gear rack meshed with a pinion that has teeth for only a portion of its circumference. A constant speed pinion drive motor could be energized remotely whenever a reading is desired. A return spring attached to the arm, could be tensioned as the arm is moved by the pinion and would return the arm to its original position as soon as the blank portion of the pinion reaches the rack. The pinion would be allowed to make a complete revolution before it stops, to bring it in readiness for the next reading.

In another example the head would be incorporated in the surface of a rotary drum about which the tape is trained. Rotation of the drum by a rotor while the tape is stationary could thus produce the required relative movement, and return the head to its starting position, equivalent to the reciprocation of the head in the embodiment of the drawings.

I claim:

1. A transmitter for use with a meter having a shaft revoluble in accordance with the passage through the meter of the substance to be measured, comprising an endless magnetic tape conditioned to indicate the quantities of said substance passing through the meter, first means adapted to be actuated by rotation of said shaft for advancing said tape past a predetermined point to indicate the quantity of said substance which has passed through the meter, a transducer head mounted at said point in functional proximity to said tape, second means independent of said first means operable to cause rapid relative movement between said head and tape a limited distance along said tape sufficient to generate by said head a reading from the tape; a receiver having control means and recording means adapted to be connected to said head to cause said rapid relative movement of said transmitter and to record the resultant reading from the head.

2. Apparatus as described in claim 1, said tape having visible indicia thereon corresponding to the magnetic indicators of quantity.

3. Apparatus as described in claim 1, wherein said means for causing rapid limited relative movement between said head and tape includes a solenoid and its armature, one of which is mechanically connected to said transducer head, the other being fixed.

4. Apparatus as described in claim 1, and code means connectable to said recording means for transmitting to said recording means signals to identify said meter.

5. Apparatus according to claim 4 including tone generating means in said receiver for energizing said code means.

6. A transmitter for use with a meter having a shaft revoluble in accordance with the passage through the meter of the substance to be measured, comprising an endless tape conditioned to indicate digital quantities of said substance passing through the meter, first means adapted to be actuated by rotation of said shaft for advancing said tape past a predetermined point to indicate the quantity of said substance which has passed through the meter, a transducer head mounted at said point in functional proximity to said tape, second means independent of said first means operable to cause rapid relative reciprocating movement between said head and tape for a limited distance along said tape sufficient to generate by said head a reading from the tape of a plurality of successive quantity indications whereby an unequivocal reading of the quantity indicated by the tape is obtained.